Sept. 24, 1935. F. H. SCHMITT 2,015,353
CREAM REMOVER
Filed July 5, 1932
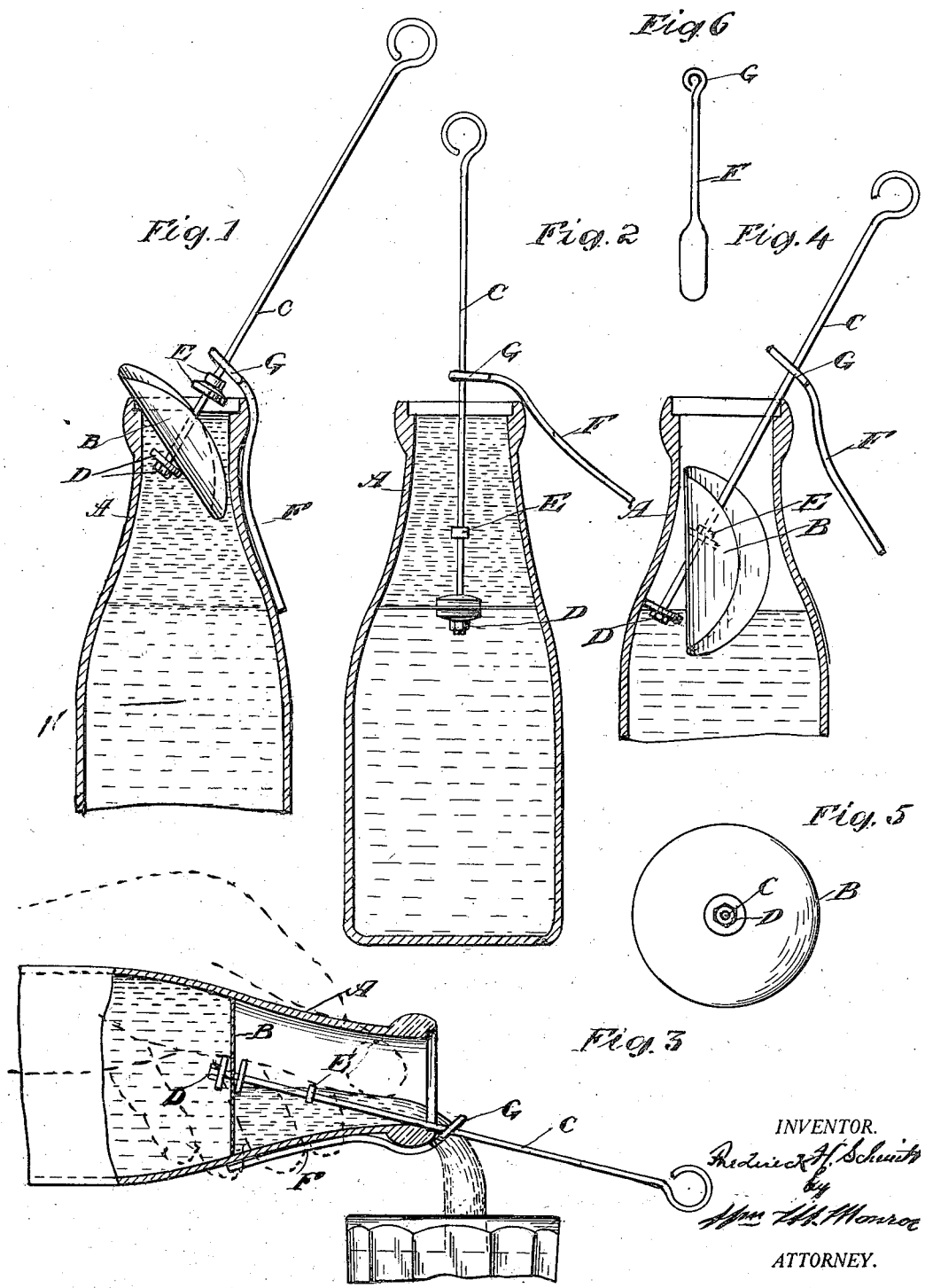
INVENTOR.
Frederick H. Schmitt
by
ATTORNEY.

Patented Sept. 24, 1935

2,015,353

UNITED STATES PATENT OFFICE 2,015,353

CREAM REMOVER

Frederick H. Schmitt, Cleveland, Ohio, assignor of one-half to Benjamin Deland, South Euclid, Ohio Application July 5, 1932, Serial No. 620,927

2 Claims. (Cl. 210—51.5)

The invention relates to improvements in means for removing the thick coating of cream, that collects overnight on the top of a milk bottle, from the milk which fills the remaining portion of the bottle without disturbing the milk therein.

The invention also is designed to provide a resilient folding disc or partition, which automatically assumes the shape of a flattened partition at the cream line and serves to provide a seal for the milk in that position, thus enabling the cream to be poured into a suitable bowl or container without spilling any of the milk.

As soon as the cream has been removed from the bottle, the resilient disc may be folded again by pressing it against the sides of the bottle, and can easily be withdrawn from the bottle.

To accomplish these and other useful results, the invention comprises the combination and arrangement of parts and construction of the various details hereinafter described, illustrated in the accompanying drawing and specifically pointed out in the claims.

In the accompanying drawing, Figure 1 is a vertical section of a milk bottle showing the manner of introducing the cream removing implement; Figure 2 is a similar view showing the implement in place and expanded to provide a milk sealing partition at the cream line; Figure 3 is a similar view showing the bottle in the cream pouring position; Figure 4 is a similar view showing the cream removing implement being removed from the bottle; Figure 5 is a bottom view of the resilient disc, and Fig. 6 is a detail side view of the clamping lever of the present device.

In these views A represents the bottle; B is a resilient disc, which when folded as shown in Figures 1 and 4 can readily be inserted into or removed from the bottle, and which will immediately expand at the cream line, and will provide a liquid tight partition therein that will keep in the milk but will enable the cream to be poured out of the bottle as shown in Figure 3.

The disc is supported upon a rigid metal rod C, upon which it is free to move between the spaced stops D and E so as to assume various positions upon the rod, for instance when introducing the disc it is folded as shown in Figure 1 and can be pushed down into the bottle when the upper stop E, engages with the disc, and the rod B, is depressed, and can be drawn out of the bottle when it is engaged with the lower stop D, and the rod is pulled out of the bottle.

When the disc has arrived at the cream line, it instantly assumes a flat expanded shape as shown in Figure 2 and since its diameter equals the internal diameter of the bottle at that level will provide a tight partition at that level and a cream base, thus enabling the cream to be poured out of the bottle without disturbing the milk.

To insure a tight joint between the edge of the disc and sides of the bottle, a clamping lever F, is employed to accomplish this result. This lever is provided with an eye G, which is movable upon the stem and is also provided with an extension which is pressed by the finger as shown in dotted lines in Figure 3 against the neck of the bottle, thus making the joint between the edge of the disc and sides of the bottle liquid tight. Large washers may be employed as stops to prevent injury to the disc.

The disc may be constructed of any suitable stiff resilient material such as pyrolin or other cellulose material or of thin fiber or metal that can be folded and will resume its shape, but is preferably highly polished and transparent.

Having described the invention what I claim as new and desire to secure by Letters Patent is:

1. A device for permitting the removal of cream from a milk-containing bottle, said device comprising a flexible disc foldable to enable it to be passed through the neck of such a bottle and adapted to automatically assume an unfolded form when positioned at the cream line in said bottle, a stem for said disc having spaced abutments thereon, said disc being slidably mounted on said stem between said abutments, and a clamping member slidable on said stem above said disc and adapted to be positioned to secure said disc in substantially liquid-tight position in said bottle at the cream line therein.

2. A device for permitting the removal of cream from a milk-containing bottle, said device comprising a stem, a flexible disc slidably mounted on said stem, spaced stop means on said stem on opposite sides of said disc, and clamping means on said stem and engageable with the side of such a bottle.

FREDERICK H. SCHMITT.